(12) United States Patent
Gorobinskiy et al.

(10) Patent No.: US 8,354,068 B2
(45) Date of Patent: Jan. 15, 2013

(54) METHOD OF DRIVING HEATING UNIT FOR REFORMER, AND REFORMER AND FUEL CELL SYSTEM INCLUDING THE SAME

(75) Inventors: Leonid Gorobinskiy, Suwon-si (KR); Ju-Yong Kim, Suwon-si (KR); Jin-Goo Ahn, Suwon-si (KR); Sung-Chul Lee, Suwon-si (KR); Yong-Kul Lee, Suwon-si (KR); Chan-Ho Lee, Suwon-si (KR); Man-Seok Han, Suwon-si (KR); Kie Hyun Nam, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 586 days.

(21) Appl. No.: 12/016,105

(22) Filed: Jan. 17, 2008

(65) Prior Publication Data

US 2008/0199745 A1 Aug. 21, 2008

(30) Foreign Application Priority Data

Feb. 21, 2007 (KR) .................. 10-2007-0017559

(51) Int. Cl.
*H01M 8/06* (2006.01)
*B01J 19/00* (2006.01)
(52) U.S. Cl. .................. 422/198; 429/423; 429/425
(58) Field of Classification Search .................. None
See application file for complete search history.

(56) References Cited

U.S. PATENT DOCUMENTS

| | | | | |
|---|---|---|---|---|
| 4,086,184 | A * | 4/1978 | Henry et al. | 502/5 |
| 6,977,002 | B2 * | 12/2005 | Takimoto et al. | 48/61 |
| 2008/0128134 | A1 * | 6/2008 | Mudunuri et al. | 166/302 |
| 2009/0123797 | A1 * | 5/2009 | Kaye et al. | 429/17 |

FOREIGN PATENT DOCUMENTS

| | | |
|---|---|---|
| JP | 2000-191304 | 7/2000 |
| JP | 2000-203803 | 7/2000 |
| JP | 2000191304 A * | 7/2000 |
| JP | 2001-180908 | 7/2001 |

(Continued)

OTHER PUBLICATIONS

JP 2000-191304 English Detailed Description from PAJ website, Komaki et al.*

(Continued)

*Primary Examiner* — Melvin C Mayes
*Assistant Examiner* — Colin W Slifka
(74) *Attorney, Agent, or Firm* — Christie, Parker & Hale, LLP

(57) ABSTRACT

A method of driving a heating unit for a fuel cell reformer, a reformer applied with the method for driving the heating unit, and/or a fuel cell system including the reformer. The method includes: supplying an oxidant to the heating unit and absorbing the oxidant by a fuel oxidizing catalyst of the heating unit; supplying a fuel at an excessive amount to the heating unit and absorbing the fuel by the fuel oxidizing catalyst of the heating unit; and supplying the fuel and the oxidant to the heating unit at a stoichiometric ratio of the fuel to the oxidant ranging from 1:1 to 2:1, wherein the heating unit generates heat through an oxidizing catalyst reaction between the fuel and the oxidant.

14 Claims, 5 Drawing Sheets

FOREIGN PATENT DOCUMENTS

| | | |
|---|---|---|
| JP | 2002-113363 | 4/2002 |
| JP | 2003-104706 | 4/2003 |
| WO | WO 9718892 A1 * | 5/1997 |

OTHER PUBLICATIONS

JP 2000-191304 English Abstract from PAJ website, Komaki et al.*
Patent Abstracts of Japan, Publication No. 2000-191304; Date of Publication: Jul. 11, 2000; in the name of Hideaki Komaki, et al.
Patent Abstracts of Japan, Publication No. 2000-203803; Date of Publication: Jul. 25, 2000; in the name of Satoshi Aoyama.
Patent Abstracts of Japan, Publication No. 2001-180908; Date of Publication: Jul. 3, 2001; in the name of Takeshi Tomizawa, et al.
Patent Abstracts of Japan, Publication No. 2002-113363; Date of Publication: Apr. 16, 2002; in the name of Satonobu Yasutake, et al.
Patent Abstracts of Japan, Publication No. 2003-104706; Date of Publication: Apr. 9, 2003; in the name of Hidetoshi Takimoto, et al.

* cited by examiner

METHOD OF DRIVING HEATING UNIT FOR REFORMER, AND REFORMER AND FUEL CELL SYSTEM INCLUDING THE SAME

CROSS-REFERENCE TO RELATED APPLICATION

This application claims priority to and the benefit of Korean Patent Application No. 10-2007-0017559, filed in the Korean Intellectual Property Office, on Feb. 21, 2007, the entire content of which is incorporated herein by reference.

BACKGROUND OF THE INVENTION

1. Field of the Invention

The present invention relates to a method of driving a heating unit for a fuel cell reformer, a reformer applied with the method for driving the heating unit, and/or a fuel cell system including the reformer.

2. Description of the Related Art

A fuel cell system (or fuel cell) is a power generation system for producing electrical energy using a hydrocarbon-based fuel.

Representative exemplary fuel cell systems include a polymer electrolyte membrane fuel cell (PEMFC) system and a direct oxidation fuel cell (DOFC) system.

The PEMFC system has power characteristics that are superior to those of conventional fuel cells, and has a low operating temperature and fast start and response characteristics. Because of this, the PEMFC system can be applied to a wide range of applications, such as portable electrical power sources for automobiles, distributed power sources for houses and public buildings, and small electrical power sources for electronic devices.

The PEMFC system is composed of a fuel cell stack for forming a fuel cell body (hereinafter referred to as a "stack" for convenience), a reformer that reforms the fuel to generate hydrogen gas and supplies the hydrogen gas to the stack, and an oxidant supplier for supplying an oxidant gas to the stack. The stack generates electrical energy through an electrochemical reaction of a reformed gas supplied from the reformer and an oxidant gas supplied from the oxidant supplier.

The reformer includes a burner (or a heating source) for generating heat energy through a catalytic oxidizing reaction of the fuel, and a reforming reaction part for generating a reformed gas from the fuel through a reforming reaction of the fuel by using the heat energy from the burner. In a conventional reformer, an oxidizing catalyst is required to be preheated at a high temperature since oxidization of a fuel gas by the oxidizing catalyst occurs at a high temperature in the burner of the reformer. Therefore, high heat efficiency is required in the above described fuel cell system.

SUMMARY OF THE INVENTION

An aspect of an embodiment of the present invention is directed to a method of driving a heating unit for a fuel cell reformer that can induce an oxidizing catalyst reaction of a fuel at a low temperature.

Other aspects of embodiments of the present invention are directed to a reformer applied with the method for driving the heating unit and/or a fuel cell system including the reformer.

According to an embodiment of the present invention, a method of driving a heating unit for a fuel cell reformer includes: supplying an oxidant to the heating unit and absorbing the oxidant by a fuel oxidizing catalyst of the heating unit; supplying a fuel at an excessive amount to the heating unit and absorbing the fuel by the fuel oxidizing catalyst of the heating unit; and supplying the fuel and the oxidant to the heating unit at a stoichiometric ratio of the fuel to the oxidant ranging from 1:1 to 2:1, wherein the heating unit generates heat through the oxidizing catalyst reaction between the fuel and the oxidant.

In one embodiment, the supplying the oxidant to the heating unit and absorbing the oxidant by the fuel oxidizing catalyst of the heating unit comprises supplying the oxidant at a range from 0.1 l/min to 10 l/min to the heating unit while the oxidizing catalyst of the heating unit is absorbing the oxidant.

In one embodiment, the supplying the fuel at the excessive amount to the heating unit and absorbing the fuel by the fuel oxidizing catalyst of the heating unit comprises supplying the fuel at a range from 0.1 to 10 l/min while the oxidizing catalyst of the heating unit is absorbing the fuel.

In one embodiment, the fuel is supplied to the heating unit at the excessive amount with respect to the oxidant while the oxidizing catalyst of the heating unit is absorbing the fuel. The excessive fuel may be supplied at a stoichiometric ratio of the fuel to the oxidant ranging from 4:1 to 10:1.

In one embodiment, the supplying the fuel and the oxidant to the heating unit at the stoichiometric ratio of the fuel to the oxidant ranging from 1:1 to 2:1 includes supplying the fuel at a range from 50 ml/min to 1400 ml/min while the fuel is provided at the stoichiometric ratio of the fuel to the oxidant ranging from 1:1 to 2:1.

In one embodiment, the method of driving the heating unit further includes heating the fuel oxidizing catalyst before the absorbing the oxidant. The heating of the fuel oxidizing catalyst may be performed at a temperature ranging from 500° C. to 1000° C. The heating of the fuel oxidizing catalyst may be performed for a duration ranging from 1 to 2 hours. The method of driving the heating unit may further include decreasing the temperature of the fuel oxidizing catalyst, which is increased during the heating of the fuel oxidizing catalyst, down to a temperature to initiate the oxidizing catalyst reaction. The cooling of the increased temperature to the temperature for initiating the oxidizing catalyst reaction may be performed at a speed ranging from 2° C./min to 6° C./min.

In one embodiment, the fuel oxidizing catalyst is adapted to absorb the fuel. The fuel oxidizing catalyst may include a strong acid functional group capable of absorbing the fuel. The fuel oxidizing catalyst may include a platinum-based metal and a solid acid having sulfuric acid ions and an inorganic oxide. The platinum-based metal may include a metal selected from the group consisting of Pt, Pd, Ru, Rh, Ir, Os, and combination thereof. The inorganic oxide may be an oxide of at least one element selected from the group consisting of Zr, Ce, Al, and combinations thereof.

Another embodiment of the present invention provides a fuel cell reformer applied with the above described method of driving the heating unit and including a heating unit adapted to generate heat by an oxidizing catalyst reaction of the fuel and the oxidant, and a reforming reaction unit adapted to generate a hydrogen-rich gas (or hydrogen gas) from the fuel through a reforming catalyst reaction.

Another embodiment of the present invention provides a fuel cell system including the above described reformer, at least one electrical generating unit that generates electrical energy by an electrochemical reaction between the hydrogen-rich gas and the oxidant, a fuel supplier that supplies the fuel to the reformer; and an oxidant supplier that supplies the oxidant to the reformer and the electrical generating unit.

DETAILED DESCRIPTION OF THE EMBODIMENTS

Figure 1:
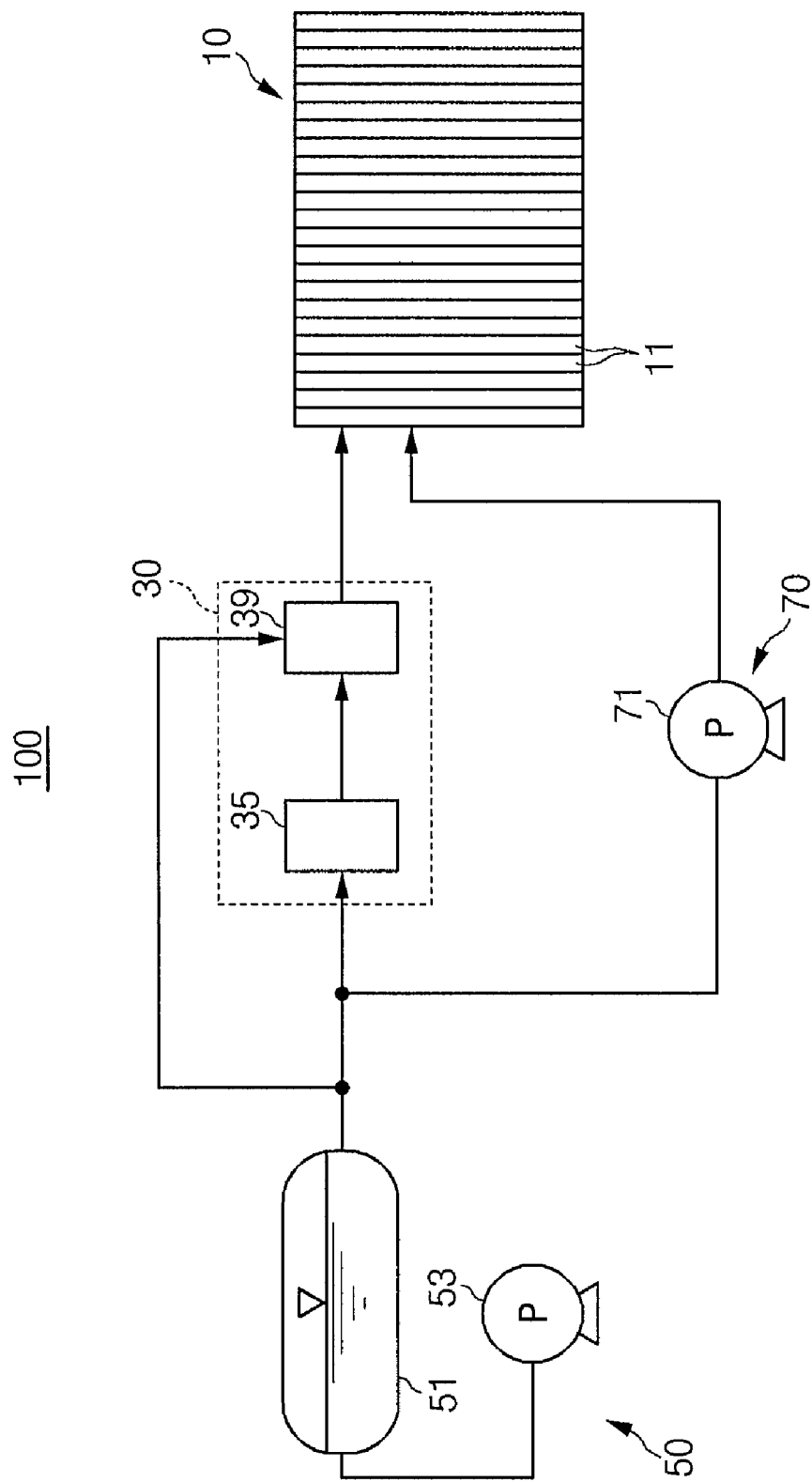
FIG. 1 is a schematic diagram showing a structure of a fuel cell system according to an embodiment of the present invention.

An embodiment of the present invention is directed to a method of driving a heating unit for a fuel cell reformer that includes a first step of supplying an oxidant to the heating unit and absorbing the oxidant by (or in) a fuel oxidizing catalyst of the heating unit, a second step of supplying a fuel at an excessive amount to the heating unit and absorbing the fuel by (or in) the fuel oxidizing catalyst of the heating unit, and a third step of supplying the fuel and the oxidant to the heating unit at a stoichiometric ratio of the fuel to the oxidant ranging from 1:1 to 2:1 (i.e., from 1 to 2 times as much fuel as oxidant), wherein the heating unit generates heat through the oxidizing catalyst reaction between the fuel and the oxidant.

In the first step, the oxidant is supplied at a range from 0.1 l/min to 10 l/min, but it is not limited thereto. The rate of supplying the oxidant may be adjusted depending on the amount of fuel oxidizing catalyst, the kind of fuel oxidizing catalyst, and the kind of oxidant. In one embodiment, when the oxidant is supplied at less than 0.1 l/min, the oxidant is insufficiently absorbed by the fuel oxidizing catalyst or the oxidant is insufficient for the oxidation reaction of the fuel. In another embodiment, when the oxidant is supplied at more than 10 l/min, excessive oxidant for absorbing by the fuel oxidizing catalyst is supplied, so the oxidant is wasted.

The duration of supplying the oxidant may be adjusted by the amount of fuel oxidizing catalyst, the kind of fuel oxidizing catalyst, and the kind of oxidant.

In the second step, the fuel (or the excessive fuel) may be supplied at a range from 0.1 l/min to 10 l/min, but it is not limited thereto. It may be suitably adjusted by the amount of fuel oxidizing catalyst, the kind of fuel oxidizing catalyst, and the kind of fuel. When the fuel (or excessive fuel) is supplied at less than 0.1 l/min, the fuel is insufficiently adsorbed by the fuel oxidizing catalyst, or the amount of fuel is insufficient to carry out the oxidation reaction of the fuel. On the other hand, in another embodiment, when the fuel is supplied at more than 10 l/min, the fuel to be absorbed by the fuel oxidizing catalyst is excessive so that the fuel is wasted.

The duration for supplying the fuel (or the excessive fuel) may be adjusted depending on the amount of fuel oxidizing catalyst, the kind of fuel oxidizing catalyst, and the kind of fuel.

In the second step, the excessive fuel with respect to the oxidant may be supplied to the heating unit to be absorbed by (or in) the fuel oxidizing catalyst.

In the second step, the supplying amount of the excessive fuel may be supplied to the heating unit at a stoichiometric ratio of the fuel to the oxidant ranging from 4:1 to 10:1 (i.e., from 4 to 10 times as much fuel as oxidant). In one embodiment, when the excessive amount of the fuel is supplied at a stoichiometric ratio of less than 4 times that of the oxidant, a proper amount of fuel (or enough fuel) cannot be absorbed by the fuel oxidizing catalyst prior to oxidation. On the other hand, in another embodiment, when the excessive amount of the fuel is supplied at a stoichiometric ratio of more than 10 times that of the oxidant, the fuel is wasted since the fuel is supplied at an amount greater than can be absorbed in the fuel oxidizing catalyst.

The stoichiometric ratio of the fuel to the oxidant corresponds to the stoichiometric ratio of the oxidation reaction scheme between the fuel and the oxidant. The ratio can be derived (or calculated) as follows. For example, when the fuel includes n-butane, and the oxidant includes oxygen, the oxidation reaction scheme of butane is represented by the following Reaction Scheme 1.

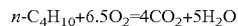

$$n\text{-}C_4H_{10}+6.5O_2=4CO_2+5H_2O \qquad \text{Reaction Scheme 1}$$

Referring to Reaction Scheme 1, the stoichiometric ratio of n-butane to oxygen is approximately 0.154 mol (1/6.5 mol). Further, the stoichiometric ratio of n-butane to oxygen may be converted to the unit of volume or weight. The conversion can be carried out by one having ordinary skill in this art, so a detailed description thereof will not be provided.

In the third step, the fuel may be supplied at a range from 50 ml/min to 1400 ml/min, but it is not limited thereto. The rate may be adjusted depending upon the kind of fuel oxidizing catalyst, the amount of fuel oxidizing catalyst, and the kind of fuel. When the supplied amount of the fuel is within the range, the fuel may be supplied at the desired stoichiometric ratio to the oxidant.

The duration for supplying the fuel may be adjusted depending upon the amount of fuel oxidizing catalyst, the kind of fuel oxidizing catalyst, the kind of fuel, and so on.

In the third step, the supplying amount of the fuel is at a stoichiometric ratio of the fuel to the oxidant ranging from 1:1 to 2:1. In one embodiment, when the supplying amount of fuel is less than that of the oxidant, the oxidizing catalyst reaction of the fuel is not carried out since the fuel is insufficiently absorbed in the fuel oxidizing catalyst. On the other hand, in another embodiment, when the supplying amount of fuel is more than twice as much as the oxidant, the oxidizing catalyst reaction of the fuel is not normally (or properly) carried out since the oxidant is insufficiently absorbed in the fuel oxidizing catalyst.

The method of driving the heating unit may further include heating the fuel oxidizing catalyst prior to the first step. When the fuel oxidizing catalyst is heated, the impurities on the surface of the fuel oxidizing catalyst are removed to induce the oxidizing catalyst reaction of the fuel at a lower temperature.

The step of heating the fuel oxidizing catalyst may be carried out at a temperature ranging from 500° C. to 1000° C. In one embodiment, when the heat treatment is carried out at a temperature that is lower than 500° C., the impurities on the fuel oxidizing catalyst surface are insufficiently removed. On the other hand, in another embodiment, when the heat treatment is carried out at higher than 1000° C., it is not desirable because the fuel oxidizing catalyst is not stable above the temperature of 1000° c.

The duration of heating the fuel oxidizing catalyst may be carried out for a time period ranging from 1 to 2 hours. In one embodiment, when the heat treatment duration is less than 1 hour, the impurities on the fuel oxidizing catalyst surface are insufficiently removed. On the other hand, in another embodiment, when the duration is more than 2 hours, it is not desirable because the fuel oxidizing catalyst is exposed to the high temperature for an excessive amount of time.

The method of driving the heating unit may further include cooling the fuel oxidizing catalyst (or reducing the temperature of the fuel oxidizing catalyst that is increased in the step of heating the fuel oxidizing catalyst) down to a temperature (that may be predetermined) for initiating the oxidizing catalyst reaction.

The step of cooling the increased temperature down to the temperature of initiating the oxidizing catalyst reaction may be performed at a speed ranging from 2° C./min to 6° C./min. In one embodiment, when the increased temperature is cooled down at a speed of less than 2° C./min, the time to cool the temperature down to the temperature of initiating the oxidizing catalyst reaction is excessive. On the other hand, in another embodiment, when the speed is more than 6° C./min, a part of the fuel oxidizing catalyst may be excessively frozen.

The fuel oxidizing catalyst may include any suitable material as long as it is capable of absorbing the fuel. According to one embodiment, it includes a material having a strong acid functional group.

Particularly, the fuel oxidizing catalyst includes, but is not limited to, a solid acid including sulfuric acid ions and an inorganic oxide, and a platinum-based metal.

The sulfuric acid ions make a strong acid site on the inorganic oxide surface. In addition, the sulfuric acid ions have a very strong bond with the inorganic oxide, so the surface of the inorganic oxide becomes thermally stable.

The solid acid can be referred to as a solid superacid since it has acidity that is stronger than that of 100% $H_2SO_4$, and has both Lewis acid sites and Bronsted acid sites. Compared to a liquid acid, the solid acid has merits in that it does not cause corrosion of the reaction equipment, it is easily separated from the product, and it does not produce waste acid since it can be recycled.

If the platinum-based metal is supported in the solid acid, the activity of the platinum-based catalyst is improved since the solid acid is a superacid and has a comparatively large specific surface area of 80 $m^2/g$ or more.

Accordingly, when the fuel oxidizing catalyst is used in the heating unit, it decreases the temperature of initiating the oxidizing catalyst reaction of the fuel and the oxidant. The oxidizing catalyst reaction of the fuel and the oxidant may be broadly divided into a first step of absorbing the fuel by (or in) the fuel oxidizing catalyst and a second step of oxidizing the adsorbed fuel. If the fuel oxidizing catalyst is used as the fuel oxidizing catalyst for the heating unit for a fuel cell reformer in the fuel cell system, the fuel is absorbed in the acid site of the solid acid of the fuel oxidizing catalyst. As the solid acid is a superacid, the fuel absorbed by the solid acid has very strong polarity. The polarity of the absorbed fuel decreases the activating energy to oxidize the fuel and induces the fuel oxidation reaction at a low temperature.

The platinum-based metal may be selected from the group consisting of Pt, Pd, Ru, Rh, Os, Ir, and combinations thereof. According to one embodiment, it is Pt.

The inorganic oxide may be an oxide of at least one element selected from the group consisting of Zr, Ce, Al, and combinations thereof. According to another embodiment, it is Zr oxide.

The fuel oxidizing catalyst may include a platinum-based metal in an amount ranging from 0.1 to 50 parts by weight based on 100 parts by weight of the fuel oxidizing catalyst. According to another embodiment, the platinum-based metal ranges from 1 to parts by weight based on 100 parts by weight of the fuel oxidizing catalyst. When the fuel oxidizing catalyst includes the platinum-based metal at less than 0.1 parts by weight, the activity of the fuel oxidizing catalyst is deteriorated. On the other hand, in another embodiment, when the platinum-based metal is at more than 50 parts by weight, the cost of producing the fuel oxidizing catalyst is too high.

The fuel oxidizing catalyst may include a solid acid ranging from 10 to 70 parts by weight based on 100 parts by weight of the fuel oxidizing catalyst. According to another embodiment, the solid acid ranges from 20 to 60 parts by weight based on 100 parts by weight of the fuel oxidizing catalyst. When the fuel oxidizing catalyst includes the solid acid at less than 10 parts by weight based on 100 parts by weight of the fuel oxidizing catalyst, the effects on adding the solid acid are not obtained. On the other hand, when the platinum-based metal is more than 70 parts by weight, the activity of the fuel oxidizing catalyst is deteriorated.

The fuel oxidizing catalyst may further include a carrier supporting the platinum-based metal and the solid acid. The carrier may be selected from the group consisting of $Al_2O_3$, $TiO_2$, $SiO_2$, and combinations thereof. According to another embodiment, it includes $Al_2O_3$.

In the case of further including the carrier, the fuel oxidizing catalyst includes the carrier at 90 or less parts by weight based on 100 parts by weight of the fuel oxidizing catalyst. According to another embodiment, the carrier ranges from 35 to 80 parts by weight. In one embodiment, when the carrier is included at more than 90 parts by weight based on 100 parts by weight of the fuel oxidizing catalyst, the activity of the fuel oxidizing catalyst is deteriorated because the amount of the platinum-based metal is decreased and the number of acid sites is decreased due to the decrease of the solid acid amount.

Hereinafter, a method of driving the heating unit for the fuel cell system is described. However, the present invention is not limited thereto, and may be modified in various suitable ways.

According to this embodiment, the fuel includes n-butane and the oxidant includes air. The fuel oxidizing catalyst includes a catalyst in which the solid acid including Pt and $ZrO_2$—$SO_4^{2-}$ is supported in $Al_2O_3$ (hereinafter referred to as Pt/$ZrO_2$—$SO_4^{2-}$/$Al_2O_3$).

First, the fuel oxidizing catalyst is heated at a temperature ranging from 500 to 1000° C. for a duration ranging from 1 to 2 hours to remove impurities on the fuel oxidizing catalyst surface. Then, air is supplied at a rate ranging from 0.1 l/min to 10 l/min, and the fuel oxidizing catalyst is cooled down to 80° C. The cooling step may be performed at a speed ranging from 2° C./min to 6° C./min. During this step, oxygen included in the air is absorbed in Pt of the fuel oxidizing catalyst.

After completing the oxygen adsorption, excessive butane is supplied together with the air at a rate ranging from 0.1 to 10 l/min. The excessive butane may be supplied at a stoichiometric ratio of butane to oxygen ranging from 4:1 to 10:1 (i.e., from 4 to 10 times as much butane as oxygen). During this step, a considerable amount of butane is absorbed in $ZrO_2$—$SO_4^{2-}$ of the fuel oxidizing catalyst. Since the absorption of the butane is an exothermic reaction, the temperature of the fuel oxidizing catalyst is slightly increased.

After completing the butane absorption, a very fast butane oxidation reaction is initiated between the oxygen absorbed in Pt and the butane absorbed in $ZrO_2$—$SO_4^{2-}$. Thereby, the oxygen absorbed in Pt is rapidly consumed. Since the butane oxidation reaction is an endothermic reaction, the temperature of the fuel oxidizing catalyst is slightly decreased.

When all oxygen absorbed in the Pt is consumed, the butane is supplied at a rate ranging from 50 ml/min to 1400 ml/min. The butane is supplied at a stoichiometric ratio of butane to oxygen ranging from 1:1 to 2:1 (i.e., from 1 to 2 times as much butane as oxygen). In this case, the oxygen is rapidly absorbed to the Pt in the fuel oxidizing catalyst to generate a lot of heat, so the temperature of the fuel oxidizing catalyst is highly (or dramatically) increased.

The temperature of the fuel oxidizing catalyst is highly increased, so the normal (or proper) butane oxidization reaction is performed.

An embodiment of the present invention further includes a fuel cell reformer including a heating unit that generates heat through an oxidizing catalyst reaction of the fuel and the oxidant, and a reforming reaction part that generates hydrogen gas from the fuel through the reforming catalyst reaction, wherein the fuel cell reformer is applied with the method for driving the heating unit.

An embodiment of the present invention provides a fuel cell system including the reformer, at least one electrical generating unit that generates electrical energy through an electrochemical reaction of hydrogen gas and an oxidant, a fuel supplier that supplies the fuel to the reformer, and an oxidant supplier that supplies the oxidant to the reformer and the electrical generating unit.

An embodiment of the present invention will hereinafter be described in more detail with reference to the accompanying drawings. However, the present invention may be embodied in many different forms and should not be construed as being limited to the embodiments set forth herein.

Figure 2:
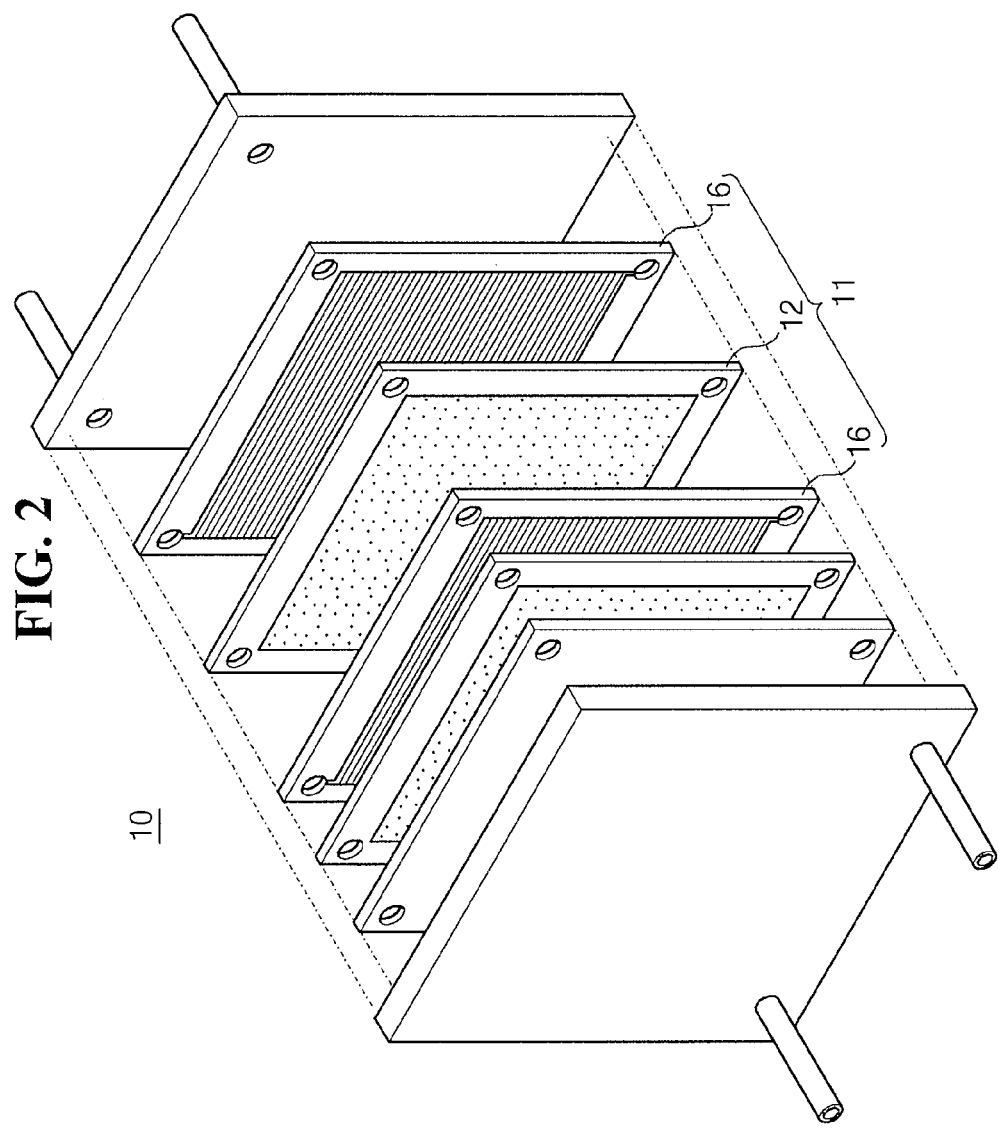
FIG. 2 is an exploded perspective schematic view showing a stack structure for the fuel cell system illustrated in FIG. 1.

FIG. 1 is a schematic view showing a structure of a fuel cell system 100 according to one embodiment of the present invention, and FIG. 2 is an exploded perspective schematic view showing a stack structure of the fuel cell system 100 illustrated in FIG. 1.

Referring to the drawings, the fuel cell system 100 is a polymer electrolyte membrane fuel cell (PEMFC), where a hydrogen-containing fuel is reformed to generate hydrogen, and then electrical energy is generated by electrochemical reactions of the hydrogen and an oxidant.

In the fuel cell system 100, the oxidant includes a gas that reacts with hydrogen, for example, oxygen or air containing oxygen stored in a separate storing space.

The fuel cell system 100 includes an electricity generating element 11 that generates electrical energy through electrochemical reactions of a reformed gas supplied from a reformer 30 and an oxidant, a fuel supplier 50 for supplying a fuel to the reformer 30 for generating hydrogen-rich gas (or hydrogen) from the fuel and supplying the hydrogen-rich gas to the electricity generating element 11, and an oxidant supplier 70 for supplying an oxidant to the reformer 30. Electricity generating elements 11 are stacked adjacent to one another to form a stack 10.

Here, the fuel cell system 100 can be a power source for supplying an electrical energy (or predetermined electrical energy) to any load such as a portable electronic device including a laptop computer and a PDA, or a mobile telecommunication device.

The reformer 30 generates hydrogen-rich gas from the hydrogen included in the fuel by a catalyst reaction such as a chemical catalyst reaction due to the heating energy, for example, a steam reforming reaction, partial oxidation, or an autothermal reaction, and supplies the generated hydrogen-rich gas to the stack 10. The reformer 30 is connected with the stack 10 and the fuel supplier 50 via a pipe line, etc.

The reformer 30 includes the heating source 35 that generates a heating energy (or predetermined heating energy) required for the reforming reaction of the fuel by the oxidation catalyst reaction between the fuel and the oxidant respectively supplied from the fuel supplier 50 and the oxidant supplier 70, and a reforming reaction part 39 that absorbs the heating energy generated from the heating source 35 to generate hydrogen from the fuel via the reforming catalyst reaction of fuel supplied from the fuel supplier 50. The reformer 30 further includes a carbon monoxide reducing part where carbon monoxide is optionally oxidized.

The heating source 35 and the reforming reaction part 39 of the reformer 30 may be independently equipped and connected to each other via a common connection element. Alternatively, they may be incorporated in a double pipeline structure where the heating source 35 is disposed at an inside portion of the double pipeline structure, and the reforming reaction part 39 is disposed at an outside portion of the double pipeline structure.

The heating source 35 includes a reactor body, and a reforming catalyst in the reactor body. The reactor body can be made in various shapes. According to one embodiment, a container-type reactor body having an inner space (or predetermined inner space) may be appropriate.

The reforming reaction part 39 includes a reactor body, and a reforming catalyst in the reactor body. The reactor body can also be made in various shapes. According to one embodiment, a container-type reactor body having an inner space (or predetermined inner space) may be appropriate.

The reforming catalyst promotes a reforming reaction of a fuel by absorbing heat from the heating source 35, and includes a catalyst selected from the group consisting of nickel (Ni), platinum (Pt), ruthenium (Ru), silver (Ag), palladium (Pd), copper (Cu), zinc (Zn), a copper-zinc alloy (Cu—Zn) and combinations thereof. Here, in one embodiment, the reforming catalyst is supported on a carrier including a material selected from the group consisting of alumina ($Al_2O_3$), silica ($SiO_2$), titania ($TiO_2$), and combinations thereof and having, for example, a pellet shape.

When the reactor body is composed of a reaction substrate, the reforming catalyst is in the channel of the reaction substrate. Alternatively, when the reactor body is composed of a container, a pellet or honey-comb type reforming catalyst is filled inside the reactor body.

The fuel supplier 50 for supplying the fuel to the reformer 30 includes a fuel tank 51 containing the fuel to be supplied to the reformer 30 and a fuel pump 53 connected with the fuel tank 51 for supplying the fuel from the fuel tank 51. The fuel tank 51 is connected with a heating source 35 of the reformer 30 and a reforming reaction part 39 via pipe lines.

The oxidant supplier 70 includes an air pump 71 that draws an oxidant with a pumping force (that may be predetermined) and supplies the oxidant to the electricity generating elements 11 of the stack 10 and to the heating source 35. As shown in FIG. 1, the oxidant supplier 70 is illustrated to supply the oxidant to the stack 10 and the heating source 35 via a single air pump 71, but the present invention is not limited thereto. It may include a pair of oxidant pumps mounted to the stack 10 and the heating source 35, respectively.

Upon driving the fuel cell system 100 according to one embodiment of the present invention, the hydrogen-rich gas generated from the reformer 30 is supplied to the electricity generating elements 11 and the oxidant is supplied to the electricity generating elements 11, and thereby the electrochemical reaction occurs by the oxidation reaction of the hydrogen and the reduction reaction of the oxidant to generate electrical energy of a power output (that may be predetermined) as well as water and heat.

Furthermore, the fuel cell system 100 may include a common control unit mounted separately that substantially controls the overall operation of the system, for example, operations of the fuel supplier 50 and the oxidant supplier 70.

As shown in FIG. 2, the stack 10 is composed of stacked electricity generating elements 11. Each of the electricity generating elements 11 includes a membrane-electrode assembly (MEA) 12 and separators (or bipolar plates) 16 disposed at respective sides of the MEA to constitute a fuel cell as a minimum unit.

The membrane-electrode assembly 12 includes an anode and a cathode respectively having active areas where electrochemical reactions of hydrogen and an oxidant occur, and an electrolyte membrane interposed between the anode and the cathode.

At the anode, hydrogen is oxidized to produce protons and electrons, and at the cathode, the protons react with an oxidant to generate heat and moisture. The electrolyte membrane functions as an ion exchanger for transferring protons generated at the anode to the cathode. The separator 16 supplies the fuel (e.g., the hydrogen-rich gas or hydrogen) and the oxidant to the membrane-electrode assembly 12, and also works as a conductor for serially coupling the anode and the cathode in the membrane-electrode assembly.

The stack 10 may be provided as a stack for any suitable polymer electrolyte fuel cell systems.

The following examples illustrate the present invention in more detail. However, it is understood that the present invention is not limited by these examples.

Preparation of a Fuel Oxidizing Catalyst

Example 1

11.01 g of $ZrO(NO_3)_2 \cdot 6H_2O$ and 20 g of $Al_2O_3$ were added to 100 ml of water and the resultant was fired at 300° C. for 1 hour to provide $ZrO_2$ supported in $Al_2O_3$. 0.981 g of $H_2SO_4$ was added to 30 ml of water and impregnated in 20 g of $ZrO_2$ supported in $Al_2O_3$. The resultant was fired at 650° C. for 3 hours to provide a $ZrO_2$—$SO_4^{2-}$ solid acid.

In addition, 3 g of $H_2PtCl_6 \cdot 6H_2O$ was added to 10 ml of water to provide a Pt precursor solution. 2.5 ml of the provided Pt precursor solution was added to 0.5 ml of water and impregnated with 6 g of $ZrO_2$—$SO_4^{2-}$. The reaction product was fired at 650° C. for 1.5 hours to provide a fuel oxidizing catalyst. The provided fuel oxidizing catalyst included $ZrO_2$—$SO_4^{2-}$ and Pt, and the fuel oxidizing catalyst included $Al_2O_3$ supporting Pt and $ZrO_2$—$SO_4^{2-}$. The fuel oxidizing catalyst included Pt at 5 parts by weight, a solid acid at 20 parts by weight, and $Al_2O_3$ at 75 parts by weight based on 100 parts by weight of the fuel oxidizing catalyst.

Manufacturing and Driving a Heating Unit

Example 2

8 ml of the fuel oxidizing catalyst obtained from Example 1 was charged into a stainless steel tube reactor (GMS 1000®, manufactured by Sunyoung Sys-Tech) to provide a heating unit. The fuel included 35 vol % of iso-butane, 50 vol % of n-butane, and 15 vol % of $C_3H_8$.

The fuel oxidizing catalyst was heated at 500° C. for 1 hour to remove impurities on the fuel oxidizing catalyst surface. Air was supplied thereto at 2 l/min to cool the fuel oxidizing catalyst down to 80° C. at a speed of 2° C./min. Oxygen included in the air was absorbed by Pt in the fuel oxidizing catalyst.

When the temperature of the fuel oxidizing catalyst reached 80° C., the excessive butane was supplied. The excessive butane was supplied at 2 l/min and the air was supplied at 2 l/min. During this process, a large amount of butane was absorbed on $ZrO_2$—$SO_4^{2-}$ in the fuel oxidizing catalyst, and the temperature of the fuel oxidizing catalyst was increased to 82° C.

The oxygen and the butane absorbed in the fuel oxidizing catalyst were oxidized, and the temperature of the catalyst began to decrease. When the temperature of the fuel oxidizing catalyst reached 80° C., butane was supplied at 279.1 ml/min, and the air was supplied at 2 l/min. Thereby, the temperature of fuel oxidizing catalyst was highly increased to 88° C., and the normal oxidizing catalyst reaction of the fuel was performed.

Example 3

The heating unit was driven by the same procedure as in Example 2, except that the excessive butane was supplied at 1 l/min instead of 2 l/min.

Example 4

The heating unit was driven by the same procedure as in Example 2, except that the excessive butane was supplied at 5 l/min instead of 2 l/min.

Example 5

The heating unit was driven by the same procedure as in Example 2, except that the excessive butane was supplied at 10 l/min instead of 2 l/min.

Example 6

The heating unit was driven by the same procedure as in Example 2, except that the butane was supplied at 65 ml/min instead of 279.1 ml/min.

Example 7

The heating unit was driven by the same procedure as in Example 2, except that the butane was supplied at 500 ml/min instead of 279.1 ml/min.

Example 8

The heating unit was driven by the same procedure as in Example 2, except that the butane was supplied at 1000 ml/min instead of 279.1 ml/min.

Example 9

The heating unit was driven by the same procedure as in Example 2, except that the butane was supplied at 1400 ml/min instead of 279.1 ml/min.

Figure 3:
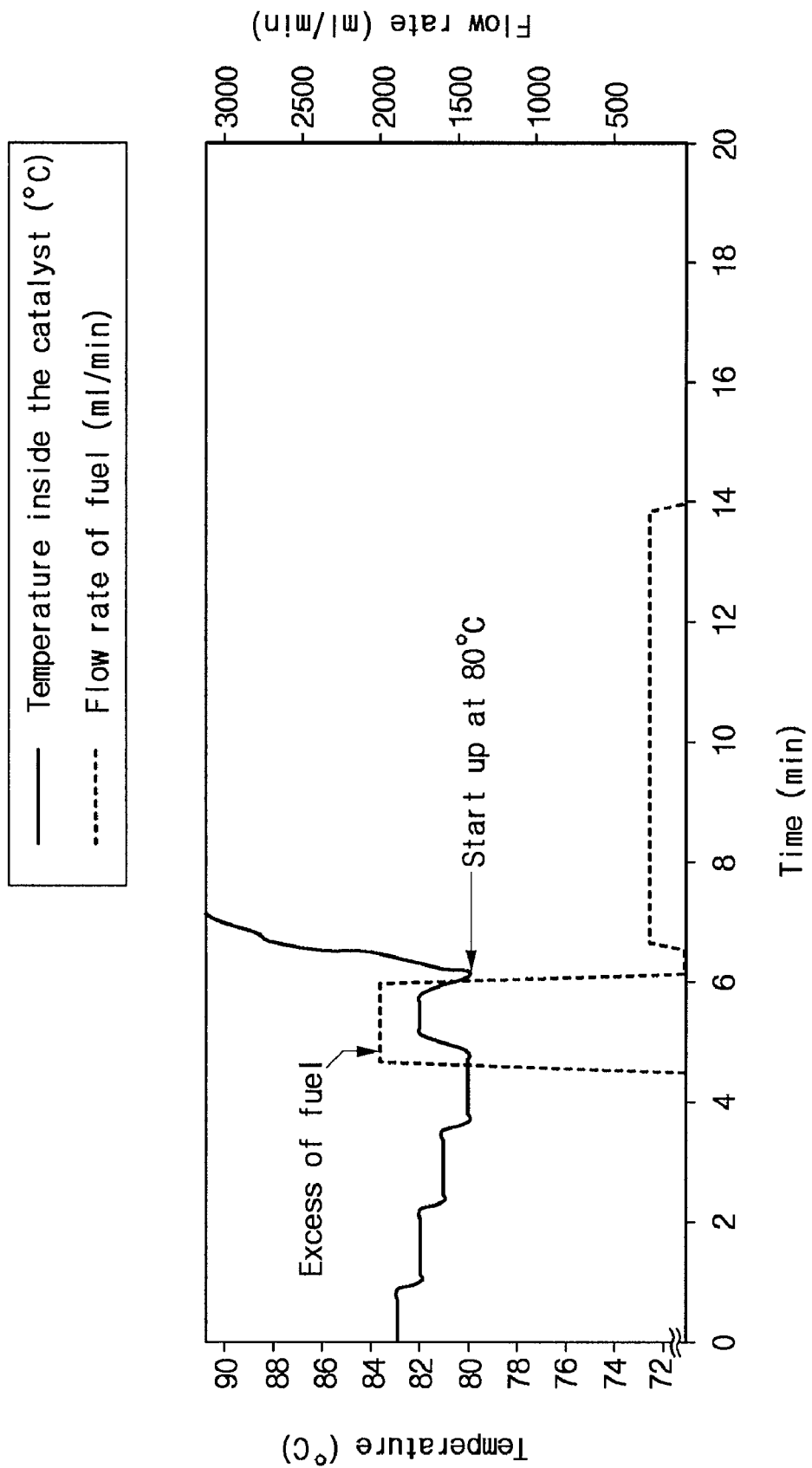
FIG. 3 and FIG. 4 are graphs showing temperature changes of a fuel oxidizing catalyst of a heating unit according to Example 2.
Figure 4:
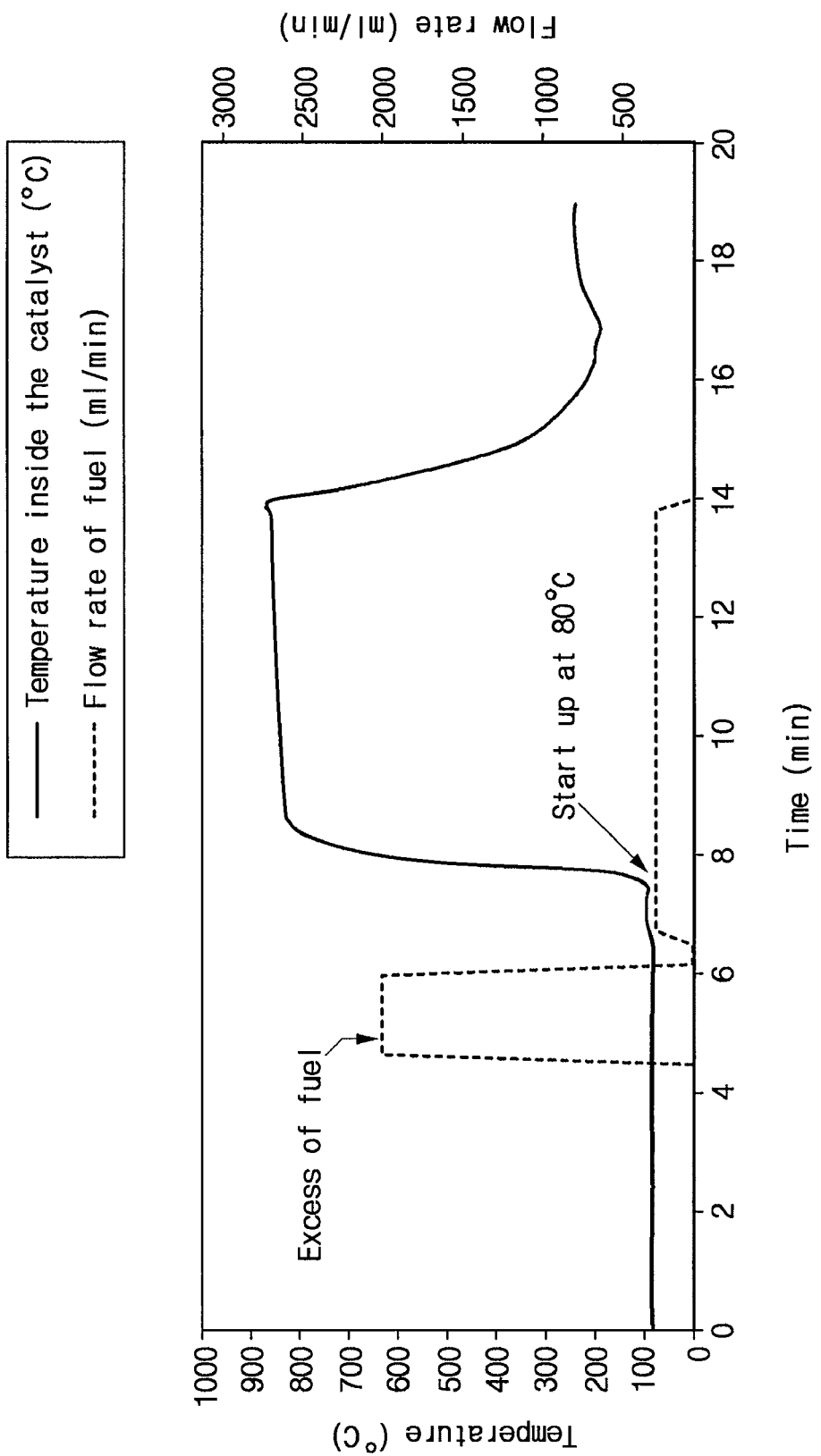

While the heating units in accordance with Examples 2 to 9 were driven, the temperature change inside fuel oxidizing catalysts was measured, and the results of Example 2 are shown in FIG. 3 and FIG. 4.

Referring FIG. 3, it is confirmed that, by supplying the excessive butane, the temperature of the fuel oxidizing catalyst was increased up to 80° C. and then decreased. Then, the temperature of the fuel oxidizing catalyst was highly increased up to 88° C. by supplying butane at 279.1 ml/min.

Referring to FIG. 4, it is confirmed that the normal oxidizing catalyst reaction of the fuel was performed after the temperature of the fuel oxidizing catalyst was highly increased up to 88° C.

The heating units according to Examples 3 to 9 showed similar temperature changes to that of the fuel oxidizing catalyst according to Example 2. Accordingly, the heating units of Examples 2 to 9 induced the oxidizing catalyst reaction of the fuel at 80° C.

Reference Example 1

8 ml of the fuel oxidizing catalyst obtained from Example 1 was charged into a stainless steel tube reactor (GMS 1000®, manufactured by Sunyoung Sys-Tech) to provide a heating unit. Air was supplied to the heating unit at 2 l/min, and heated at 500° C. The heating unit was cooled down to the desired temperature, and the fuel and the air were supplied. Then, whether the oxidizing catalyst reaction of the fuel was initiated at the temperature was monitored.

The fuel included 35 vol % of iso-butane, 50 vol % of n-butane, and 15 vol % of $C_3H_8$, and the fuel was supplied at 279.1 ml/min and the air was supplied at 2 l/min.

Figure 5:
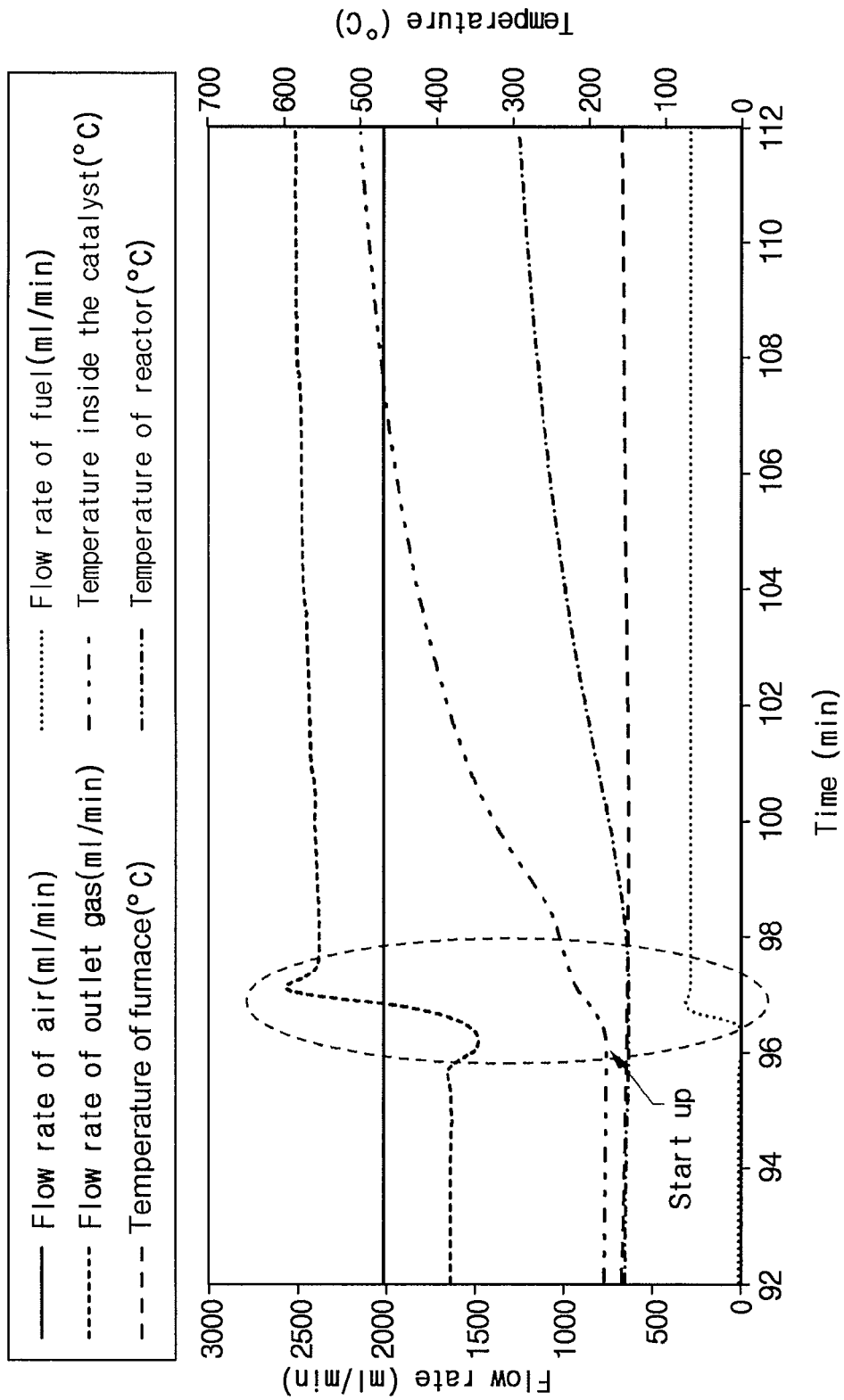
FIG. 5 is a graph showing a temperature change of a fuel oxidizing catalyst of a heating unit according to Reference Example 1.

The fuel oxidizing catalyst of the heating unit was monitored to determine the temperature change, and the results are shown in FIG. 5. Referring to FIG. 5, it is confirmed that the oxidizing catalyst reaction of the fuel was induced at 180° C.

Accordingly, the heating units according to Examples 2 to 9 induced the oxidizing catalyst reaction of the fuel at 80° C., but the heating unit according to Reference Example 1 induced the oxidizing catalyst reaction of the fuel at 180° C. This resulted from applying the method of driving the heating unit according to one embodiment of the present invention to the heating units according to Examples 2 to 9.

The method of driving the heating unit for a fuel cell reformer enables inducing of the oxidizing catalyst reaction of the fuel at a relatively low temperature. Further, the fuel cell system applied with the method of driving the heating unit improves the thermal efficiency and enables a relatively fast driving speed.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of driving a heating unit for a fuel cell reformer, the method comprising:
   supplying an oxidant in an absence of a fuel to the heating unit and absorbing the oxidant by a fuel oxidizing catalyst of the heating unit in an absence of a fuel;
   then supplying a fuel to the heating unit after the supplying of the oxidant and the absorbing of the oxidant by the fuel oxidizing catalyst, and absorbing the fuel by the fuel oxidizing catalyst of the heating unit, the fuel being supplied in an excessive amount at a stoichiometric ratio of the fuel to the oxidant ranging from 4:1 to 10:1, wherein the fuel oxidizing catalyst comprises a strong acid functional group capable of absorbing the supplied fuel; and
   subsequently supplying the fuel and the oxidant to the heating unit at a stoichiometric ratio of the fuel to the oxidant ranging from 1:1 to 2:1,
   wherein the heating unit generates heat through an oxidizing catalyst reaction between the fuel and the oxidant.

2. The method of driving the heating unit according to claim 1, wherein the supplying the oxidant to the heating unit and absorbing the oxidant by the fuel oxidizing catalyst of the heating unit comprises supplying the oxidant at a range from 0.1 l/min to 10 l/min to the heating unit while the fuel oxidizing catalyst of the heating unit is absorbing the oxidant.

3. The method of driving the heating unit according to claim 1, wherein the supplying the fuel at the excessive amount to the heating unit and absorbing the fuel by the fuel oxidizing catalyst of the heating unit comprises supplying the fuel at a range from 0.1 to 10 l/min while the fuel oxidizing catalyst of the heating unit is absorbing the fuel.

4. The method of driving the heating unit according to claim 1, wherein the fuel is supplied to the heating unit at the excessive amount with respect to the oxidant while the fuel oxidizing catalyst of the heating unit is absorbing the fuel.

5. The method of driving the heating unit according to claim 1, wherein the supplying the fuel and the oxidant to the heating unit at the stoichiometric ratio of the fuel to the oxidant ranging from 1:1 to 2:1 comprises supplying the fuel at a range from 50 ml/min to 1400 ml/min while the fuel is provided at the stoichiometric ratio of the fuel to the oxidant ranging from 1:1 to 2:1.

6. The method of driving the heating unit according to claim 1, further comprising heating the fuel oxidizing catalyst before the absorbing the oxidant.

7. The method of driving the heating unit according to claim 6, wherein the heating of the fuel oxidizing catalyst is performed at a temperature ranging from 500° C. to 1000° C.

8. The method of driving the heating unit according to claim 6, wherein the heating of the fuel oxidizing catalyst is performed for a duration ranging from 1 to 2 hours.

9. The method of driving the heating unit according to claim 6, further comprising decreasing the temperature of the fuel oxidizing catalyst, which is increased during the heating of the fuel oxidizing catalyst, down to a temperature to initiate the oxidizing catalyst reaction.

10. The method of driving the heating unit according to claim 9, wherein the cooling of the increased temperature to the temperature for initiating the oxidizing catalyst reaction is performed at a speed ranging from 2° C./min to 6° C./min.

11. The method of driving the heating unit according to claim 1, wherein the fuel oxidizing catalyst is adapted to absorb the fuel.

12. The method of driving the heating unit according to claim 1, wherein the fuel oxidizing catalyst comprises a platinum-based metal and a solid acid comprising sulfuric acid ions and an inorganic oxide.

13. The method of driving the heating unit according to claim 12, wherein the platinum-based metal comprises a metal selected from the group consisting of Pt, Pd, Ru, Rh, Ir, Os, and combination thereof.

14. The method of driving the heating unit according to claim 12, wherein the inorganic oxide is an oxide of at least one element selected from the group consisting of Zr, Ce, Al, and combinations thereof.

* * * * *